US008958796B2

(12) United States Patent
Punz et al.

(10) Patent No.: US 8,958,796 B2
(45) Date of Patent: Feb. 17, 2015

(54) METHOD AND SYSTEM FOR CONNECTING A USER EQUIPMENT TO A NETWORK DEVICE VIA A MOBILE COMMUNICATION NETWORK

(75) Inventors: Gottfried Punz, Dossenheim (DE); Andreas Kunz, Heddesheim (DE)

(73) Assignee: NEC Europe Ltd., Heidelberg (DE)

( * ) Notice: Subject to any disclaimer, the term of this patent is extended or adjusted under 35 U.S.C. 154(b) by 11 days.

(21) Appl. No.: 13/882,283

(22) PCT Filed: Oct. 31, 2011

(86) PCT No.: PCT/EP2011/005497
§ 371 (c)(1),
(2), (4) Date: Apr. 29, 2013

(87) PCT Pub. No.: WO2012/055572
PCT Pub. Date: May 3, 2012

(65) Prior Publication Data
US 2013/0217389 A1    Aug. 22, 2013

(30) Foreign Application Priority Data

Oct. 29, 2010  (EP) .................................... 10014107

(51) Int. Cl.
*H04W 88/02*   (2009.01)
*H04W 60/00*   (2009.01)
*H04W 60/04*   (2009.01)
(52) U.S. Cl.
CPC .............. *H04W 60/00* (2013.01); *H04W 60/04* (2013.01)
USPC ...................................................... 455/435.1

(58) Field of Classification Search
USPC ............ 455/435.1, 435.2, 436, 458; 370/221, 370/328, 331
See application file for complete search history.

(56) References Cited

U.S. PATENT DOCUMENTS

| 7,366,156 B2 | 4/2008 | Ahn | |
|---|---|---|---|
| 2014/0003348 A1* | 1/2014 | Velev et al. | 370/328 |
| 2014/0016614 A1* | 1/2014 | Velev et al. | 370/331 |

FOREIGN PATENT DOCUMENTS

| JP | 2004254316 A | 9/2004 |
|---|---|---|
| WO | 2010/044618 | 4/2010 |

OTHER PUBLICATIONS

International Search Report dated Feb. 10, 2012, corresponding to PCT/EP2011/005497.
3rd Generation Partnership Project; Technical Specification Group Core Network and Terminals; Mobile Radio Interface Layer 3 Specification; Core Network Protocols; Sep. 28, 2010; pp. 1-616 XP050442264.

(Continued)

*Primary Examiner* — Diane Mizrahi
(74) *Attorney, Agent, or Firm* — Young & Thompson (57) ABSTRACT

A method for connecting a user equipment to a network device via a mobile communication network, applicable to devices that must always be reachable while saving bandwidth of the mobile communication network, where the user equipment operates in a passive state capable of responding to a page signal by switching to an attempting-to-attach state, and at least an information of a current tracking area and an identifier of the user equipment is stored in an entity of the mobile communication network and/or a network device, this information being used for sending the paging signal to the equipment.

19 Claims, 5 Drawing Sheets overall concept for proposed optimization (56) References Cited

OTHER PUBLICATIONS

3rd Generation Partnership Project; Technical Specification Group Services and System Aspects; General Packet Radio Service (GPRS) Enhancements for Evolved Universal Terrestrial Radio Access Network (E-UTRAN) acess (Realease 10); No. V10.1.0; Sep. 29, 2010; pp. 1-271; XP050442333.

Motorola: "Key Issue for Extra Low Power Consumption"; 3GPP Draft; S2-100522_MTC_LowPowerConsumption, 3rd Generation Partnership Project (3gpp); Mobile Competence Centre; vol. SA WG2; Jan. 12, 2010; XP050433053.

"Discussion on MTC Idle states", 3GPP TSG-WG #69-bis, R2-102033, Alcatel-Lucent Shanghai Bell, Agenda item 4.3.2, Apr. 2010.

"3rd Generation Partnership Project; Technical Specification Group Services and System Aspects; Service requirements for Machine-Type Communications (MTC); Stage 1 (Release 10)", 3GPP TS 22.368 V10.1.0, Jun. 2010.

\* cited by examiner

Figure 1: state transitions in current 3GPP model (UE side; simplified)

Figure 2: state transitions in proposed new 3GPP model (UE side; simplified)

Figure 3: overall concept for proposed optimization

Figure 4: state transitions in proposed new 3GPP model (MTC server side; simplified)

Figure 5: proposed new message flow for establishment of connectivity

METHOD AND SYSTEM FOR CONNECTING A USER EQUIPMENT TO A NETWORK DEVICE VIA A MOBILE COMMUNICATION NETWORK

BACKGROUND OF THE INVENTION

The invention relates to a method for connecting a user equipment to a network device via a mobile communication network wherein the user equipment comprises at least a deregistered state and a registered state, wherein the deregistered state comprises at least two substates, a normal and an attempting-to-attach substate, for defining a connectivity state of the user equipment to the mobile communication network, and wherein the user equipment is connectable to the mobile communication network and wherein the network device is connected to the mobile communication network comprising the steps of
   a) Paging of the user equipment by a paging signal using a, preferably unique, user equipment identifier,
   b) Switching to the attempting-to-attach substate of the deregistered state of the user equipment when receiving a paging signal,
   c) Attaching the user equipment to the mobile communication network, and
   d) Switching to the registered state of the user equipment depending on a result of the attachment according to step c).

The present invention also relates to a system for connecting a user equipment to a network device via a mobile communication network, wherein the user equipment is formed such to provide at least a deregistered state and a registered state, wherein the deregistered state comprises at least two substates, a normal and an attempting-to-attach substate, for defining a connectivity state of the user equipment to the mobile communication network, and wherein the user equipment is connectable to the mobile communication network and wherein the network device is connected to the mobile communication network, and wherein the user equipment is formed such that on receiving a paging signal due to paging using a, preferably unique, user equipment identifier, the user equipment switches to the attempting-to-attach substate of the deregistered state of the user equipment, attaches to the mobile communication network, and switches to the registered state of the user equipment depending on a result of the attachment according to step c).

Conventional connecting techniques in mobile communication networks, for example a cell phone connecting to a base station of a UMTS mobile communication network and further for example via the UMTS mobile communication network and the internet to a dedicated server, like an email server, have been mainly designed to be used by human beings.

Conventional states of a user equipment, also named mobile terminal or mobile station, comprises therefore in general two operational states in particular regarding registration, namely a deregistered state and a registered state. In addition, in registered state the user equipment can be in two different modes regarding its connection, namely an EMM-connected or an EMM-idle state. When a signalling connection is established the user equipment may be in the registered state in normal-service substate and in a further, additional substate EMM-connected. If a NAS signalling connection is not established the user equipment may be in a substate EMM-idle. When the user equipment is in the registered state, the user equipment may transmit data to respectively via the mobile communication network to a dedicated server for example in the internet. In the deregistered state the user equipment may be in normal substate or in attempting-to-attach state. In the normal deregistered substate the user equipment cannot transmit or receive data but may be able to initiate an attach or a combined attached procedure. For initiating an attach or combined attached procedure the user equipment switches in the deregistered state to an attempting-to-attach substate initiating an attach. When the attach to the mobile communication network is successful the user equipment becomes registered in the mobile communication network and switches to the registered state allowing the transfer of data between the user equipment and the dedicated server. In this normal-service registered state the user equipment may transmit data which, if the user equipment is in EMM-idle, may be initiated by a Service Request NAS signalling message.

Figure 1:
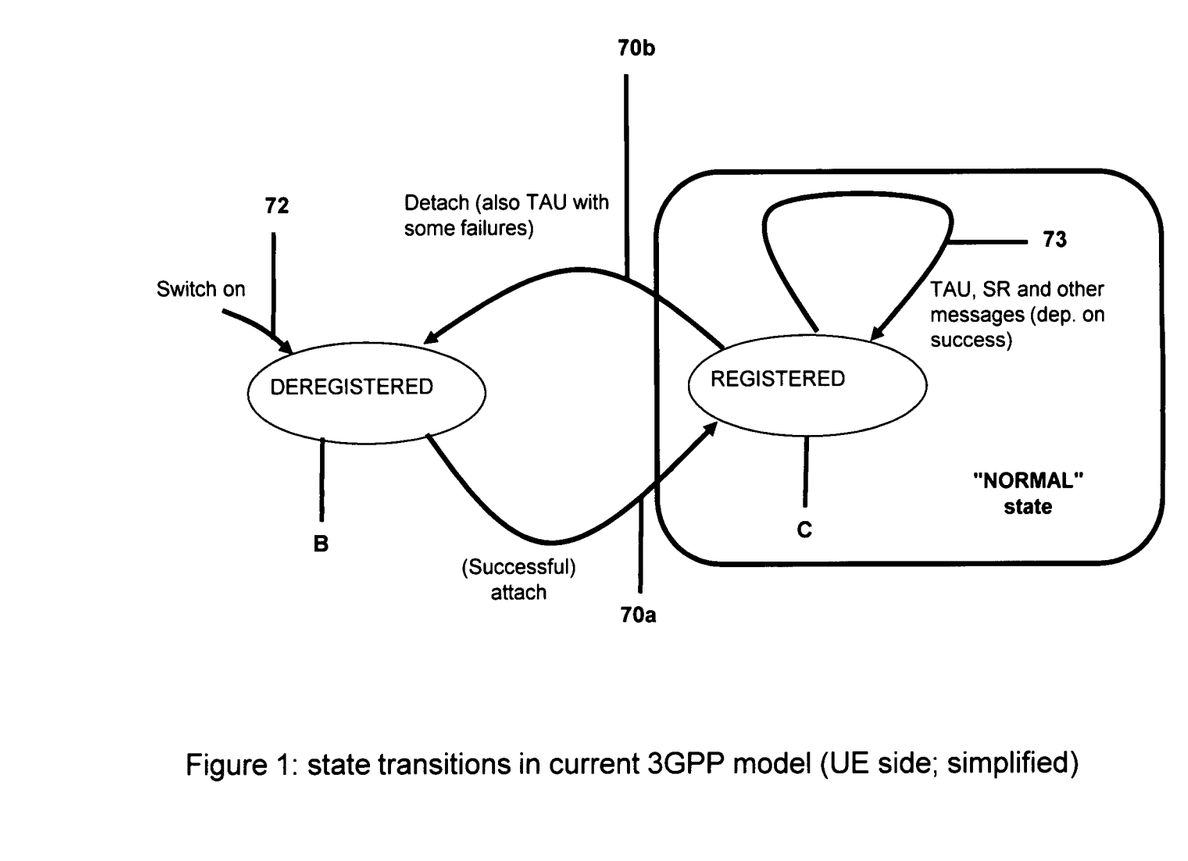
FIG. 1 is illustrating conventional state switching of a user equipment registering with a mobile communication network.

FIG. 1 shows a conventional switching of states of a user equipment in a current 3GPP model. When the user equipment is switched on (reference sign 72) the user equipment is first in a deregistered state B. After switching on 72 the user equipment likes to become attached to a mobile communication network and therefore tries to register with the mobile communication network as soon as possible. After a successful attach (reference sign 70*a*) the user equipment switches from the deregistered state B to a registered state C. The user equipment also remains registered, i.e. in the normal-service substate, as long as no error condition or restriction from the mobile communication network occurs. The registration is prerequisite to reachability of the user equipment which may be defined via paging based on tracking area information stored in a mobile communication network entity, preferably a mobility management entity and the tracking area information depends on location registration of the user equipment.

However, for new classes of devices, in particular machine type communication devices, conventional registration techniques have a number of drawbacks. For example if a machine type communication device is fixed in a location and scheduled to deliver data once every month via the mobile communication network this would cause costs due to a high energy consumption of the user equipment for being and staying registered in the mobile communication network. Another drawback is that the registration of the machine type communication device creates a signalling overhead and shortens the bandwidth for other especially none-machine-type-communication devices in the mobile communication network. In the registered state the user equipment has to be permanently staying in the necessary context state for example security context, location context, bearer context, etc.

To overcome these drawbacks the user equipment may be switched on and/or off at appropriate times: The user equipment may be switched on for example when an uplink communication, i.e. from the user equipment to the mobile communication network, is necessary: The user equipment then attaches and registers to the mobile communication network and all necessary context is created subsequently. Switching on and off may be handled by local environment devices of the user equipment, for example the user equipment may be communicating with or connected to a timer, counter thresholds, sensors or the like.

Another option to overcome these drawbacks is the use of well-defined time slots for a communication, in particular for the registration process, of the user equipment with the mobile communication network. These time slots are fixed and known to the user equipment and to a predefined entity of the mobile communication network handling the establishment of the connection. This may be implemented for example by attaching the user equipment to a timer device which activates or deactivates the user equipment power switch sufficiently before and after the defined time slots. In order to obtain a reliable bidirectional connection between the user equipment and the mobile communication network the local time of the mobile communication network and the user equipment must be well synchronized.

However this solution has inter alia one main disadvantage: This solution may not be applicable to devices which need to be reachable at all times, since by turning off the user equipment the user equipment is deregistered and is not able to receive any communication signals from the mobile communication network.

SUMMARY OF THE INVENTION

It is therefore an objective of the present invention to provide a method and a system method for connecting a user equipment to a network device via a mobile communication network which is applicable to devices that must be always reachable while saving bandwidth of the mobile communication network.

It is a further objective of the present invention to provide a method and a system for connecting a user equipment to a network device via a mobile communication network, which is cost effective, which may be performed and/or operated with a reduced overall energy consumption and which requires few changes in conventional methods and systems.

In accordance with the invention, the aforementioned objectives are accomplished by a method and a system as recited by the claims and described in detail below.

According to the invention claimed, the method is characterized in that the user equipment is formed such to provide a passive state as connectivity state, wherein the user equipment in the passive state is at least page-able by an entity of the mobile communication network and that, if the user equipment is in the passive state, the user equipment is switched according to step b) after performing step a) and that at least information of a current tracking area and the, preferably unique, identifier of the user equipment is stored in an entity of the mobile communication network and/or a network device and that the information is used for at least performing step a).

Further according to the invention claimed, the system is characterized in that the user equipment is formed such to provide a passive state as connectivity state, wherein the user equipment in the passive state is at least page-able by an entity of the mobile communication network and that the user equipment is formed such that, if the user equipment is in the passive state, the user equipment is switched according to step b) after performing step a) and that at least information of a current tracking area and the, preferably unique, identifier of the user equipment is stored in a network entity of the mobile communication network and/or a network device and that the information is used for at least performing step a).

According to the invention it has been first recognized that providing a passive state as connectivity state for the user's equipment allows using a plurality of different types of user equipment due to the provided reachability in the passive state.

According to the invention it has further been first recognized, that the overall energy consumption of the user equipment and the entities of the mobile communication network is reduced thus saving costs and mobile communication network resources in the mobile communication network, since for example a permanent allocation of frequencies, channels, and context state, etc. for data transmission of the user equipment by the mobile communication network is not required.

According to a preferred embodiment the, preferably unique, identifier is at least one of the IMSI identifier, IMEI identifier or an IP address. One of the advantages is, that the unique identifier in form of an IMSI identifier, i. e. meaning international mobile subscriber identity, that a user of the user equipment may be reliably identified for example by country, used network and a mobile subscriber identification number corresponding to the user. Paging with the identifier being the IMSI identifier may provide an enhanced reachability of the user equipment without causing additional load within the whole mobile communication network, because the paging area may be limited according to the location information being available to the mobile network.

According to a further preferred embodiment at least step a) is initiated by the network device, preferably in form of a machine type communication server, connected to the mobile communication network. One advantage is that the machine type communication server serves as data receiving device for the user equipment, therefore initiation of at least step a) by the network device reduces data traffic to be exchanged for coordinating paging.

According to a further preferred embodiment the user equipment is switched to the passive state after a detaching procedure from the mobile communication network. This reduces further the energy consumption of the user equipment and at the same time reachability of the user equipment is still provided. A further advantage is, that mobile communication network resources allocated for the user equipment may be released subsequently after the user equipment has transferred its predetermined data to the network device.

According to a further preferred embodiment the user equipment remains in the passive state for a predetermined period of time. This provides an effective use of energy consumed by the user equipment avoiding that subsequent paging initiates a switching from the passive state to a deregistered state and further to initiate an attaching procedure for the mobile communication network. Thus unnecessary switching to a more active operational state of the user equipment is avoided. This also avoids an unnecessary allocation of mobile communication network resources.

According to the further preferred embodiment the user equipment is stationary or of low mobility. This means that the user equipment is stationary or at least very localized: For example the user equipment is restricted to a home or certain local area. In general the user equipment is located such, that for example the user equipment does not move outside of a coverage area of a base station of a mobile communication network. This provides a reliable connection of the user equipment to the mobile communication network.

According to a further preferred embodiment a user and/or control plane connection is initiated by the network device, preferably in form of a machine-type-communication server. This provides a simple initiation of a user and/or control plane connection when needed, for example if an application running on the network device requires retrieving data from the user equipment. In particular if the connection is initiated by the machine-type-communication server, the machine type communication server acts as authoritative source for example knowing the location of the machine type communication device which may be exactly known or at least estimated with a predetermined accuracy providing a fast connection establishment with the user equipment.

According to a further preferred embodiment for establishing the user and/or control plane connection a new connection via a new interface between at least one mobility management entity of the mobile communication network and the network device, preferably in form of a machine type communication server, is provided. This provides a direct and therefore fast connection establishment between at least one mobility management entity in the mobile communication network and the network device, preferably in form of a machine type communication server. A further advantage of this new connection via the new interface is, that traffic within the mobile communication network for establishing the user and/or control plane connection is reduced.

According to a further preferred embodiment the new connection is used for at least initiating step a). Since for example according to the network trigged service request procedure in 3GPP TS 23.401 as of 29 Sep. 2010 a mobility management entity of the mobile communication network is used for paging, a complicated adaption to other paging techniques using different mobile communication network entities or devices are not necessary by allowing a connection between the entity which initiates paging and the entity performing paging.

According to a further preferred embodiment tracking area information are included and transmitted via the new connection for initiating step a). This enhances the paging process, since a tracking area of the user equipment to be paged is included in the corresponding paging signal, so a time consuming paging of user equipment in unknown tracking areas, is not necessary.

According to a further preferred embodiment the network device, preferably in form of a machine type communication server, allocates an IP-address of the user equipment in a passive state. This provides a fast and reliable reconnection of the user equipment and the network device via the mobile communication network since a time consuming new assignment of an IP-address to the user equipment by a mobile communication network entity is not necessary. The allocated IP-address can be easily be assigned to the user equipment when being in the registered state for data communication.

According to a further preferred embodiment the mobile communication network is cell-based and the user equipment is camped on a cell. Therefore one of the advantages is, that the location information of the user equipment being camped on a certain cell of the mobile communication network only has to be transmitted once when registering the user equipment with the mobile communication network for the first time, like in a self-provisioning process. In the future this information may be already stored and is available in the mobile communication network enhancing the attaching and registration process of the user equipment with the mobile communication network even more.

BRIEF DESCRIPTION OF THE DRAWINGS

There are several ways how to design and further develop the teaching of the present invention in an advantageous way. To this end, it is to be referred to the patent claims subordinate to patent claims 1 and 13 on the one hand, and to the following explanation of preferred examples of embodiments of the invention, illustrated by the drawing on the other hand. In connection with the explanation of preferred embodiments of the invention by the aid of the drawing, generally preferred embodiments and further developments of the teaching will be explained. In the drawing

DETAILED DESCRIPTION OF THE PREFERRED EMBODIMENTS

FIG. 1 is illustrating conventional state switching of a user equipment registering with a mobile communication network.

In FIG. 1 there are shown conventional state transitions in a current 3GPP model of the user equipment. When the user equipment is switched on (reference sign 72) the user equipment is first in a deregistered state B. When the user equipment is in the deregistered state B an attachment procedure for registering the user equipment with a mobile communication network is initiated (reference sign 70a). If the attachment procedure with a mobile communication network is successful, the user equipment switches from the deregistered state B to the registered state C. In the registered state C, which is a so-called normal state suitable for data transmission, the user equipment may perform tracking area updates, service requests or other messages via the mobile communication network. If for example a tracking area update has failed, the user equipment may be detached from the mobile communication network and switch from the registered state C to the deregistered state B.

Figure 2:
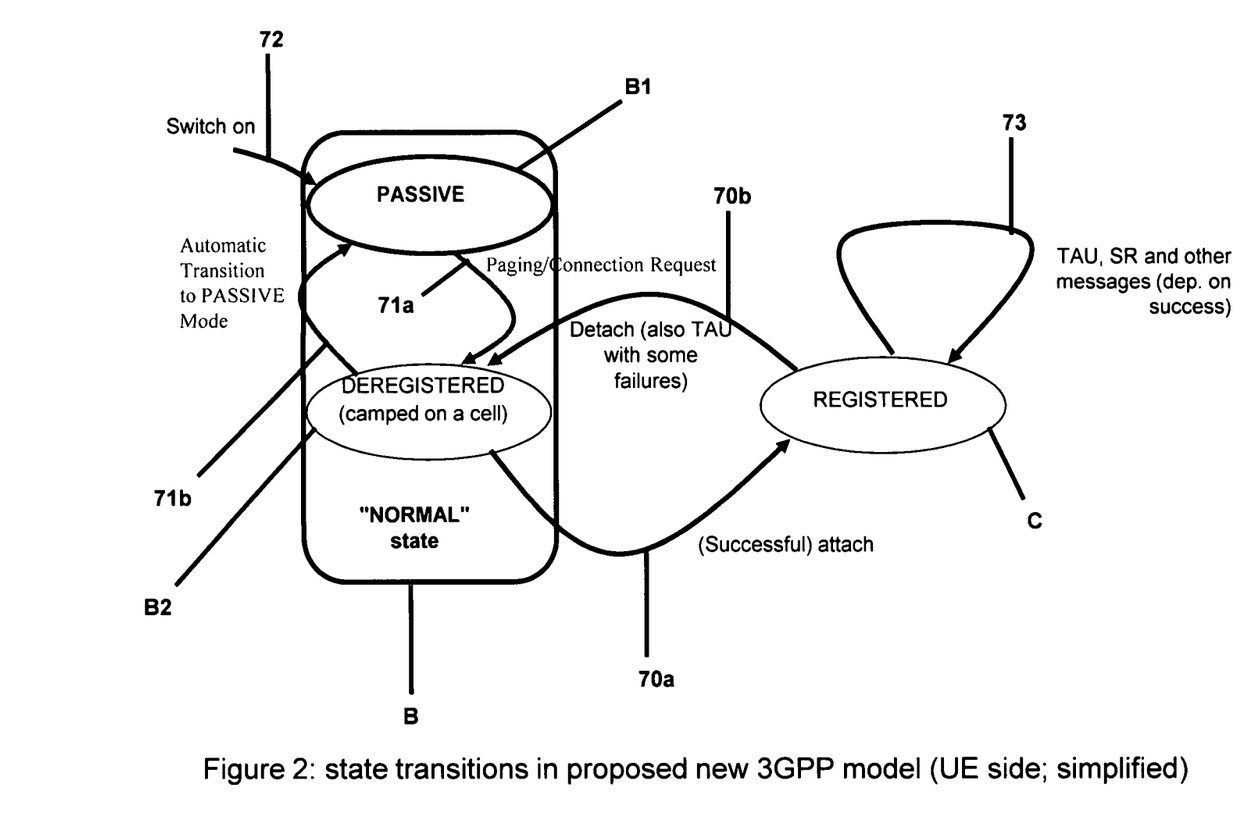
FIG. 2 is illustrating state switching of a user equipment registering with the mobile communication network by a method according to a first embodiment of the present invention.

FIG. 2 is illustrating state switching of a user equipment registering with a mobile communication network by a method according to a first embodiment of the present invention.

In contrast to FIG. 1 the deregistered state B of the user equipment comprises now two substates, a passive state B1 and the conventional or normal deregistered state B2. It is further assumed that the user equipment is camped on a cell. When the user equipment is switched on (reference sign 72) the user equipment first enters the passive substate B1. When a paging and/or connection request is received by the user equipment or initiated by the user equipment itself, for example via a timer or the like the user equipment switches from the passive substate B1 to the deregistered substate B2 (reference sign 71a). In the deregistered substate B2 of the deregistered state B the user equipment then tries to attach to the mobile communication network (reference sign 70a). If attaching of a user equipment is successful, the user equipment is switched from the deregistered state B in the deregistered substate B2 to the registered state C. In the registered state C the tracking area updates, service request messages and other messages may be transmitted to and/or via the mobile communication network to a corresponding destination, for example the network device.

If for example a tracking area update fails, the user equipment may be automatically detached (reference sign 70b) from the mobile communication network thus entering deregistered substate B2 of deregistered state B. In the deregistered substate B2 the user equipment may further automatically switch to passive substate B1 in particular for example for energy saving. That means that an establishment of connectivity and all necessary state handling and state switching is only done when needed, either by the user equipment itself or by a external trigger, in particular a paging request from the network device, preferably the machine type communication server via the mobile communication network in case of a terminating traffic triggering. The user equipment then switches its operational state from the passive substate B1 to the deregistered substate B2 in order to initiate the regular attach procedure to attach the user equipment to the mobile communication network. The passive state B1 as described here explicitly could also be included as an extension within the deregistered state B.

Figure 3:
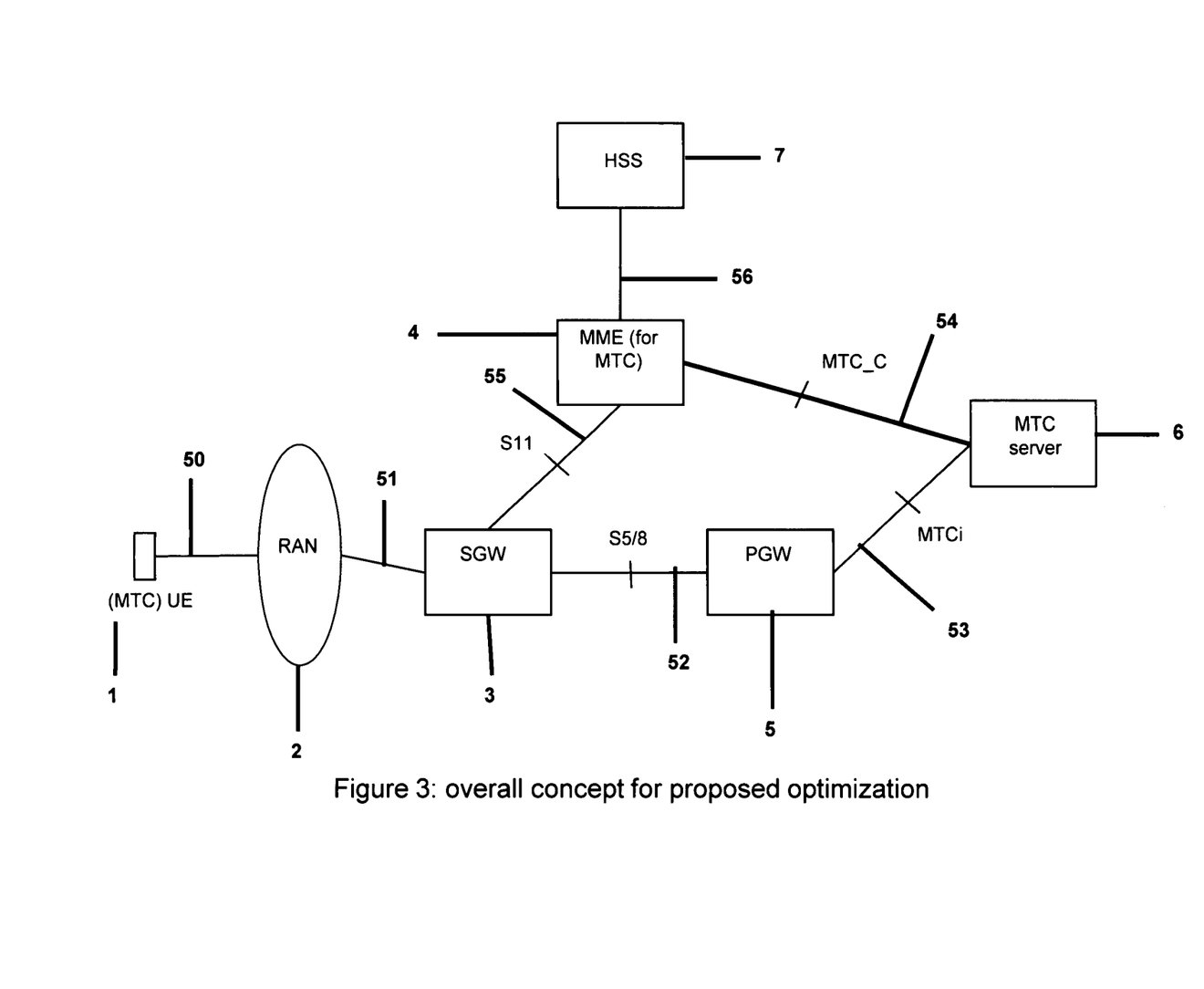
FIG. 3 is illustrating a system according to a second embodiment of the present invention.

FIG. 3 is illustrating a system according to a second embodiment of the present invention.

In FIG. 3 there is shown a system comprising a machine type communication user equipment 1 and a mobile communication network, comprising a radio access network 2, a serving gateway 3, a mobility management entity enhanced or designed for machine type communication 4, a packet data network gateway 5, and a home subscriber server 7. The machine type communication user equipment 1 is connected to the radio access network 2 via a wireless connection 50. The radio access network 2 is connected via a connection 51 to the serving gateway 3. The serving gateway 3 is connected via a S5/S8 interface to a packet data network gateway 5. The serving gateway 3 is further connected via an interface S11 with a connection 55 to the mobility management entity 4, enhanced or designed for machine type communication. The mobility management entity 4 enhanced or designed for machine type communication is connected to the home subscriber server 7 via a connection 56. The packet data network gateway 5 is further connected to a machine type communication server 6 via a machine type communication interface MTCi serving as a data gateway between the mobile communication network and an external network comprising the machine type communication server 6. The machine type communication server 6 is connected via connection 54 to the mobility management entity 4 enhanced or designed for machine type communication via a corresponding interface MTC_C. If the machine type communication user equipment 1 is in the substate passive B1 the current tracking area is stored either in the machine type communication server 6 or in the home subscriber server 7. If the tracking area of the machine type communication user equipment 1 is stored in the home subscriber server 7 with an entry the machine type communication user equipment 1 with the tracking area information may be stored like a subscription property.

The binding of a tracking area to a machine type communication user equipment 1 or device within that tracking area might be determined by a first paging of machine type communication user equipment 1. This maybe performed automatically. The connection 52 via the interface S5/S8 and the connection 55 via the interface S11 between the serving gateway 3 and the packet data network gateway 5 respectively the mobility management entity 4 enhanced for machine type communication do not need to be available since for example in an LTE/EPS mobile communication network, with this invention, no EPS bearer context is in place thus no user and/or control plane connectivity has to be provided or prepared.

In contrast to conventional techniques user and/or control plane connectivity via the interfaces S5, S8 and S11 may be established on demand by the machine type communication server 6. The machine type communication server 6 connects to the mobility management entity 4, enhanced or designed for machine type communication, located within the mobile communication network. Of course the machine type communication server 6 may connect to several mobility management entities 4 enhanced or designed for machine type communication within the mobile communication network. The machine type communication server 6 sends a triggering signal to the mobility management entity 4 via connection 54 via interface MTC_C instead of via connection 55 via interface S11 of serving gateway 3 and via connection 52 via interface S5/S8 from packet data network 5. The machine type communication server 6 might include information about the tracking area of the machine type communication user equipment 1 specifying the location of the machine type communication user equipment 1. To identify the machine type communication user equipment 1 within the mobile communication a unique identifier may be used, preferably the international mobile subscriber identity IMSI. The connection 54 via new interface MTC-C may be based on the GPRS Tunnelling Protocol (GTP-C) and used for initiating a control plane connection for paging between the serving gateway 3 and the mobility management entity 4. However as mentioned above, since no context is in place in the mobility management entity 4, the machine type communication server 6 must include for example the tracking area information of the machine type communication user equipment 1. When using the GPRS Tunnelling Protocol this must be modified to include this information as well as the mobility management entity 4 to extract this information. The machine type communication server 6 may also allocate an IP address for the machine type communication user equipment 1, although the machine type communication user equipment does not have an IP-address in the passive substate B1.

Figure 4:
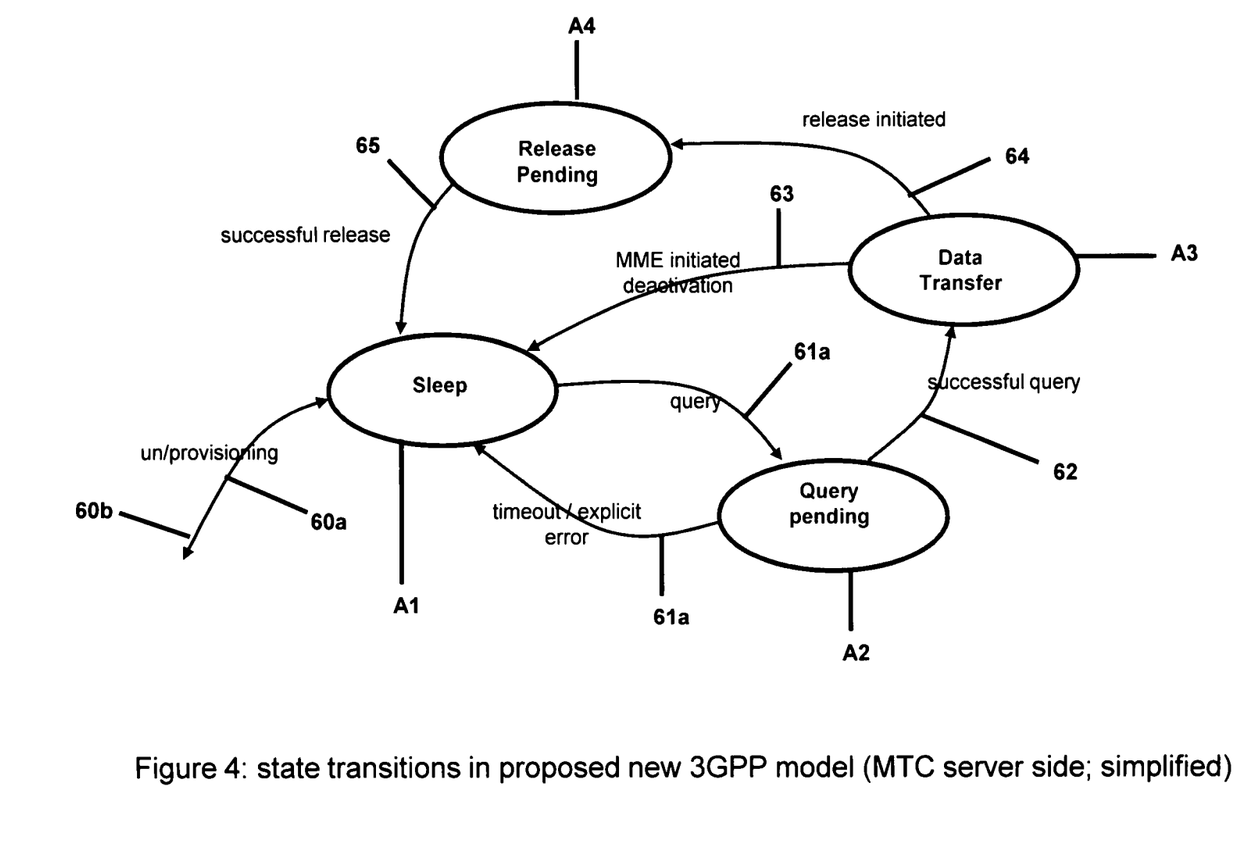
FIG. 4 is illustrating a state switching of a machine type communication server by a method according to a third embodiment of the present invention and FIG. 5 is illustrating a registering and deregistering of a user equipment by a method according to a fourth embodiment of the present invention.

FIG. 4 is illustrating a state switching of a machine type communication server by a method according to a third embodiment of the present invention.

If the machine type communication server 6 does not receive or transmit data the machine type communication server 6 is in a sleep mode A1. To attach, register or link a machine type communication user equipment 1 to the machine type communication server 6 a provisioning procedure is performed, so that the machine type communication server 6 knows about the existence of the machine type communication user equipment 1 for later data transmission.

If for example an application running on the machine type communication server 6 in sleep mode A1 needs data from the linked machine type communication user equipment 1, the application issues a query 61a for data transmission and the machine type communication server 6 enters now state A2 defining query pending. The machine type communication server 6 waits now for information provided by the mobility management entity 4, enhanced or designed for machine type communication, for successful registration of the machine type communication user equipment 1 with the mobile communication network. If a timeout and/or an explicit error occurs in the state A2 the machine type communication server switches back (reference sign 61b) to sleep mode A1. If the query is successful (reference sign 62) the machine type communication server 6 switches to data transfer state A3 and data transfer between the machine type communication user equipment 1 and the machine type communication server 6 is enabled. If the data transfer is completed a release for releasing or detaching the machine type communication user equipment 1 from the machine type communication server 6 is initiated (reference sign 64) and the machine type communication server 6 switches to state release pending A4. The machine type communication server 6 waits for information of a successful detaching of the machine type communication user equipment 1 of the mobility management entity 4, enhanced or designed for machine type communication.

If the release is successful (reference sign 65) the machine type communication server 6 switches again to sleep state A1. If the release was not successful a retry may be initiated from the data transfer state A3. A data transfer may also be deactivated (reference sign 63) by the mobility management entity 4 causing directly the switching of the state of the machine type communication server 6 from data transfer state A3 to sleep state A1. A reason for a mobility management entity initiated deactivation may be a withdrawal of the subscription of the machine type communication user equipment 1 by the home subscriber server 7, an overload procedure handling by the mobility management entity 4, enhanced or designed for machine type communication and/or maintenance activity at the mobility management entity 4, enhanced or designed for machine type communication.

Figure 5:
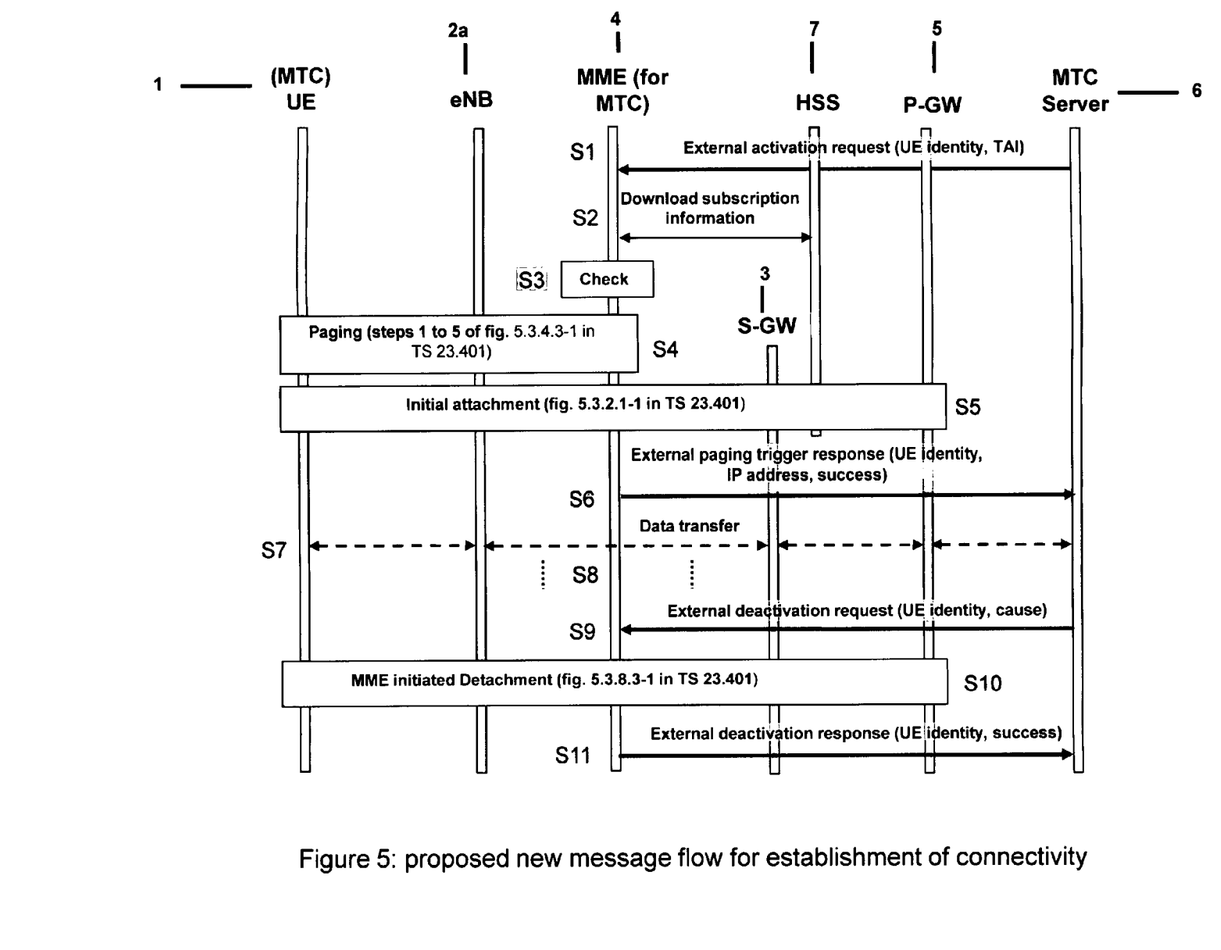

FIG. 5 is illustrating a registering and deregistering of a user equipment by a method according to a fourth embodiment of the present invention.

In FIG. 5 a method for establishing a connectivity setup between a machine type communication user equipment and a machine type communication server 6 via a mobile communication network is shown. The machine type communication user equipment 1 is in the beginning in the passive substate B1. The location information, preferably the tracking area information for paging as well as the user equipment identity is stored in the machine type communication server 6. In a first step S1 the machine type communication server 6 sends an activation signal, requesting establishment of connectivity and a current state of the user equipment, to the mobility management entity 4, enhanced or designed for machine type communication. This activation signal includes the user equipment identity and tracking area information. The machine type communication user equipment identity for example IMSI, IMEI or an IP-address if statically provisioned may be included in the request. Since the machine type communication user equipment 1 is not registered, i.e. camping in a cell of the mobile communication network in the substate B1, the mobility management entity 4, enhanced or designed for machine type communication, downloads in a second step S2 a subscriber profile, indicating the machine type communication subscription with subscripted features for the machine type communication user equipment 1. If for example other user equipment identities instead of IMSI are used for retrieving the subscriber profile from the home subscriber server 7 further enhancement in a mobility management entity-home subscriber server signalling is required. Also further identities may be relevant for the machine type communication, for example a group identity or the like.

After downloading subscription information from the home subscriber server 7 the mobility management entity 4, enhanced or designed for machine type communication checks in a third step S3 the downloaded subscription information and determines a corresponding tracking area for paging. A tracking area information, where the machine type communication user equipment in form of a machine type communication device resides is available in the subscriber profile of the downloaded subscription information or indicated or included as mentioned above in the activation signal from the machine type communication server 6. The mobility management entity 4, enhanced or designed for machine type communication, then pages in a fourth step S4 the machine type communication user equipment 1 according to conventional steps preferably according to the network trigger service request procedure according to 3GPP TS 23.401 as of 29 Sep. 2010 preferably according to FIG. 5.3.4.3-1. The machine type communication user equipment 1 receives the sent-out paging signal respectively gets triggered by the paging signal and switches into the deregistered state B2 from the passive substate B1. This results in initiating an initial attach procedure in a fifth step S5 according, preferably to the attach procedure of 3GPP TS 23.401 as of 29 Sep. 2010, preferably in particular according to FIG. 5.3.2.1-1. The machine type communication user equipment 1 switches now to the registered state C, when the attach procedure was successful. In a sixth step S6 the mobility management entity 4, enhanced or designed for machine type communication, acknowledges the paging request of the machine type communication user equipment 1 to the machine type communication server 6, including the machine type communication user equipment identity and a corresponding success report. In a seventh step S7 the machine type communication user equipment 1 now transfers data via an evolved node B 2a and via the serving gateway 3 and the packet data network gateway 5 to the machine type communication server 6. Since the machine type communication user equipment 1 is an attached respectively registered state further data transfers may be effected and/or the machine type communication user equipment 1 may fall into an idle state in an eighth step S8.

After completion of the data transmission the machine type communication server 6 initiates a deactivation or detaching request of the machine type communication user equipment 1 towards the machine type communication server 6 in a ninth step S9 wherein the deactivation request may include in particular the machine type communication user equipment identity and a reason for deactivation, for example completeness of the data transfer. This deactivation request is sent by the machine type communication server 6 to the mobility management entity 4, enhanced or designed for machine type communication. The mobility management entity 4, enhanced or designed for machine type communication performs in a tenth step S10 the mobility-management-entity-initiated detach procedure according to 3GPP TS 23.401 as of 29 Sep. 2010, preferably according to FIG. 5.3.8.3-1.

After a successful detachment of the machine type communication user equipment 1 the mobility management entity 4, enhanced or designed for machine type communication, acknowledges in an eleventh step S11 the successful detachment of the machine type communication user equipment 1 to the machine type communication server 6, including the machine type communication user equipment identity and a corresponding success report. A deactivation may also be initiated by the mobility management entity 4, enhanced or designed for machine type communication itself.

The machine type communication user equipment 1 according to one of the FIGS. 1 to 5 must be pageable. In 3GPP TS 23.122 as of 28 Sep. 2010, subclause 4.7 a user equipment 1 or mobile station is required to listen to all paging messages that could address it according to 3GPP TS 45.002 as of 1 Oct. 2010, when the following conditions are all satisfied: A SIM is inserted, the mobile station is camped on a cell, the mobile station is not in a state "idle, no IMSI" and the mobile station is not performing the task to search for available public land mobile networks.

According to 3GPP TS 23.122 as of 28 Sep. 2010, subclause 4.7 conditions apply for the deregistered state B of a user equipment. Since it can be deduced from 3GPP TS 24.301 as of 28 Sep. 2010 that an initial attach procedure shall be initiated when receiving a paging signal. The paging signal in this connection of the user equipment has to be based on the IMSI identifier since by definition no context with S-temporary mobile subscriber identity S-TMSI is available. However since IMSI paging is considered as an error recovery mechanism a legacy user equipment should spend almost no time in this state. According to the required behaviour according to 3GPP TS 24.301 as of 28 Sep. 2010 an attach procedure anyway has to be performed. The machine type communication user equipment 1 may choose to remain in the passive state B1 however for an extended period of time and the machine type communication user equipment 1 may be paged by the IMSI identifier regularly, i. e. not for error recovery. Since paging by the IMSI-identifier is preferably not applied network wide here, this does not cause any load problems in the mobile communication network.

Preferably the machine type communication user equipment may be camped on a cell, so that only a latency of the initial attach procedure remains resulting in tolerating slight delays in the order of seconds for the communication when registering the machine type communication user equipment with the mobile communication network.

In summary the present invention provides instead of "always-on/always attached", the "almost never on/never attached" paradigm saving mobile communication network resources and at least machine type communication user equipment power consumption. The present invention provides further an intermediate state for machine type communication user equipment, called passive state, enabling the machine type communication user equipment of being page-able but not attached to the mobile communication network.

Further a control plane interface between the mobile communication network and the machine type communication user equipment is provided. Even further in the passive state of the machine type communication user equipment a storing of a location associated with the machine type communication user equipment identifier on the granularity of the different tracking areas is provided.

Preferably the machine type communication user equipment is kept in detached respectively in the passive state most of the time. In this state the machine type communication user equipment remains passive, until an outgoing or incoming traffic has to be handled. However, the machine type communication user equipment in the passive state reads mobile communication network information preferably in broadcast messages. Except for location information, preferably stored in a subscription property in the home subscriber server, no active or dynamic state for the machine type communication user equipment needs to be stored in an entity of the mobile communication network. This leads to a reduction of signalling with and within the mobile communication network in contrast to machine type communication user equipment in a registered state and/or idle registered state. By exhibiting the control plane interface towards the mobile communication network this enables externally triggered paging for machine type communication user equipment resulting in optimizations for machine type communication devices and data traffic between the machine type communication user equipment and a mobile communication network and/or a network device.

Further advantages of the present invention are that unnecessary idle mode signalling between the machine type communication user equipment and the mobile communication network and/or the network device is avoided. Further dynamic state information traffic within the mobile communication network and/or with the machine type communication user equipment and/or the network device is significantly reduced. Even further a power consumption of machine type communication user equipment and corresponding mobile communication network devices is reduced. The present invention may also be easily be implemented and used on user equipment concerning machine type communication, for example consumption metering, non real-time data acquisition, counters, inventory reporting or the like, meaning devices which send or receive data infrequently, preferably having communication intervals separated in the order of days.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for connecting a user equipment to a network device via a mobile communication network, wherein the user equipment comprises at least a deregistered state and a registered state, the deregistered state having at least a normal substrate and an attempting-to-attach substrate, for defining a connectivity state of the user equipment to the mobile communication network, the user equipment being connectable to the mobile communication network and the network device being connected to the mobile communication network, the method comprising the steps of:
 a) paging the user equipment by a paging signal using a user equipment identifier;
 b) switching to the attempting-to-attach substate of the deregistered state of the user equipment upon receiving the paging signal;
 c) attaching the user equipment to the mobile communication network; and
 d) switching to the registered state of the user equipment depending on a result of the attachment according to step c),
 wherein the user equipment is formed such to provide a passive state as a connectivity state in which the user equipment is at least page-able by an entity of the mobile communication network, and
 wherein, in a condition where the user equipment is operating in the passive state, the user equipment is switched according to step b) after performing step a), and
 wherein at least an information of a current tracking area and the user equipment identifier is stored in an entity of the mobile communication network and/or a network device, said information being used at least for performing step a).

2. The method according to claim 1, wherein the user equipment identifier is at least one of an International Mobile Subscriber Identity (IMSI) identifier, an International Mobile Station Equipment Identity (IMEI) identifier, or an Internet Protocol (IP) address.

3. The method according to claim 1, wherein at least step a) is initiated by the network device.

4. The method according to claim 1, wherein the user equipment is switched to the passive state after a detaching procedure from the mobile communication network.

5. The method according to claim 1, wherein the user equipment remains in the passive state for a predetermined period of time.

6. The method according to claim 3, wherein the network device is a machine type communication server.

7. The method according to claim 1, wherein the user equipment is stationary or of low mobility.

8. The method according to claim 1, wherein a user and/or control plane connection is initiated by the network device.

9. The method according to claim 8, wherein the network device is a machine type communication server.

10. The method according to claim 1, wherein, for establishing the user and/or control plane connection, a new connection via a new interface is provided between at least one mobility management entity and the network device.

11. A method according claim 10, wherein the new connection is used for at least initiating step a).

12. The method according to claim 10, wherein the network device is a machine type communication server.

13. The method according to claim 1, wherein tracking area information are included and transmitted via the new connection for initiating step a).

14. The method according to claim 1, wherein the network device, allocates an Internet Protocol (IP) address of the user equipment in the passive state.

15. The method according to claim 14, wherein the network device is a machine type communication server.

16. The method according to claim 1, wherein the mobile communication network is cell-based and the user equipment is camped on a cell.

17. The method according to claim 1, wherein the user equipment identifier is a unique identifier.

18. A system for connecting a user equipment to a network device via a mobile communication network, comprising:
   user equipment formed such to provide at least a deregistered state and a registered state, the deregistered state having at least a normal substrate and an attempting-to-attach substrate, for defining a connectivity state of the user equipment to the mobile communication network,
   the user equipment being connectable to the mobile communication network and the network device being connected to the mobile communication network, and
   the user equipment being formed such that, upon receiving a paging signal due to a paging using a user equipment identifier, the user equipment performs a first switching to the attempting-to-attach substate of the deregistered state of the user equipment, performs an attachment to the mobile communication network, and performs a second switching to the registered state of the user equipment depending on a result of the attachment,
   wherein the user equipment is formed such to provide a passive state as a connectivity state in which the user equipment is at least page-able by an entity of the mobile communication network,
   wherein the user equipment is formed such that, in a case where the user equipment is in the passive state, the user equipment is switched according to the first switching after receiving the paging signal,
   wherein at least information of a current tracking area and the user equipment identifier is stored in an entity of the mobile communication network and/or a network device, and
   wherein the information is used at least for the paging.

19. The method according to claim 18, wherein the user equipment identifier is a unique identifier.

* * * * *